(12) United States Patent  (10) Patent No.: US 8,670,606 B2
Beeler et al.  (45) Date of Patent: Mar. 11, 2014

(54) SYSTEM AND METHOD FOR CALCULATING AN OPTIMIZATION FOR A FACIAL RECONSTRUCTION BASED ON PHOTOMETRIC AND SURFACE CONSISTENCY

(75) Inventors: Thabo Dominik Beeler, Savognin (CH); Bernd Bickel, Zurich (CH); Markus Gross, Uster (CH); Robert Sumner, Zurich (CH); Paul Beardsley, Zurich (CH)

(73) Assignee: Disney Enterprises, Inc., Burbank, CA (US)

( * ) Notice: Subject to any disclaimer, the term of this patent is extended or adjusted under 35 U.S.C. 154(b) by 575 days.

(21) Appl. No.: 12/897,518

(22) Filed: Oct. 4, 2010

(65) Prior Publication Data

US 2011/0175912 A1  Jul. 21, 2011

Related U.S. Application Data

(63) Continuation-in-part of application No. 12/689,170, filed on Jan. 18, 2010.

(60) Provisional application No. 61/310,667, filed on Mar. 4, 2010.

(51) Int. Cl.
  *G06K 9/00*  (2006.01)
(52) U.S. Cl.
  USPC .......................................... 382/154; 382/118
(58) Field of Classification Search
  USPC .................................................. 382/118, 154
  See application file for complete search history.

(56) References Cited

U.S. PATENT DOCUMENTS

| | | | |
|---|---|---|---|
| 6,903,738 B2 * | 6/2005 | Pfister et al. | 345/420 |
| 7,436,988 B2 * | 10/2008 | Zhang et al. | 382/118 |
| 2002/0106114 A1 * | 8/2002 | Yan et al. | 382/118 |
| 2005/0140670 A1 * | 6/2005 | Wu et al. | 345/419 |
| 2008/0246765 A1 * | 10/2008 | Grenfell | 345/423 |
| 2009/0052796 A1 * | 2/2009 | Furukawa et al. | 382/260 |
| 2009/0297020 A1 * | 12/2009 | Beardsley et al. | 382/154 |
| 2010/0054579 A1 * | 3/2010 | Okutomi et al. | 382/154 |
| 2011/0175900 A1 * | 7/2011 | Beeler et al. | 345/419 |

OTHER PUBLICATIONS

Beeler et al., High-Quality Single-Shot Capture of Facial Geometry, ACM Transactions on Graphics, vol. 29, No. 4, Article 40, Jul. 2010, pp. 1-9.*
Beeler et al., Improved Reconstruction of Deforming Surfaces by Cancelling Ambient Occlusion, Springer-Verlag Berlin Heidelberg, 2012, pp. 30-43.*
Multiview—optimization, Ladikos et al., BVMC 2008, pp. 1-14.*
Hiep et al., Towards high-resolution large-scale multi-view stereo, Computer Vision and Pattern Recognition, IEEE Conference on, Jun. 2009, pp. 1430-1437.*

* cited by examiner

*Primary Examiner* — Jayesh A Patel
(74) *Attorney, Agent, or Firm* — Patterson & Sheridan LLP (57) ABSTRACT

A computer-implemented method for generating a three-dimensional model of an object. The method includes generating a coarse geometry mesh of the object; calculating an optimization for the coarse geometry mesh based on photometric consistency and surface consistency associated with the coarse geometry mesh; and refining the coarse geometry mesh with the optimization to generate the three-dimensional model for the object.

19 Claims, 4 Drawing Sheets

SYSTEM AND METHOD FOR CALCULATING AN OPTIMIZATION FOR A FACIAL RECONSTRUCTION BASED ON PHOTOMETRIC AND SURFACE CONSISTENCY

CROSS-REFERENCE TO RELATED APPLICATIONS

This application is a continuation-in-part of U.S. patent application Ser. No. 12/689,170, filed on Jan. 18, 2010, and also claims priority to U.S. provisional patent application Ser. No. 61/310,667, filed on Mar. 4, 2010. Each of these related applications is hereby incorporated herein by reference.

BACKGROUND

1. Field of the Invention

The present invention relates to the field of computer graphics and computer vision and, in particular, to a system and method for mesoscopic geometry modulation.

2. Description of the Related Art

Recently there has been an increasing demand for three-dimensional (3D) face models. The movie industry relies more and more on computer graphics (CG) to place human actors in situations that are physically not feasible. In some situations, the actor is completely replaced by a corresponding virtual counterpart since the required shots would endanger the actor.

To integrate the actors or their CG representations seamlessly, light and shadows cast from other objects must be matched. Conventional approaches using coarse facial models are not sufficient since the human eye is trained to read faces, so even subtle imperfections are spotted immediately. Also, secondary effects, such as wrinkle formation, are especially hard and tedious to create for an animator or by physical simulation, but these secondary effects are essential for natural face appearance.

Currently, the only practical option is to acquire a model of the face using 3D capture. The acquired models can be either integrated directly into a movie or can be used to control other faces. In addition, the movie industry is not the only industry that demands realistic face models. Computer games have a demand for virtual characters. Also, medical science has an interest in such models.

Conventional approaches to 3D capture may be classified as either depth estimation techniques or normal estimation techniques. The depth variation of mesoscopic skin details, such as pores and wrinkles, is in the micrometer range. Most depth estimation techniques simply cannot achieve that level of detail with current hardware. Laser scanning is capable of recovering depth variations at these scales, but this technology produces insufficient results because of the translucency of skin and/or the time required for the acquisition process. As a workaround, a plaster mold of the face is scanned instead. Each of these depth estimation techniques suffers from various drawbacks, including the cumbersome process of obtaining a plaster mold of the actor's face.

Normal estimation techniques distinguish between diffuse and specular normals that emanate from the surface of an object. The specular normals encode much higher detail than the diffuse normals. The diffuse and specular normals can be estimated based on the light reflected at the surface of the subject. Every normal reflects light from a different direction. Given the direction of the light, the normal may be estimated. Two opposing lines of research exist depending on the direction of the incident light. The first line of research uses a single light source at a known position and known direction. However, to sample the whole space of possible normals, the light has to be moved. Thus, the system is only suited for static scenes. The second line of research places light sources all around the subject. The issue here is to distinguish from which light source the reflected light originates.

Conventional normal estimation techniques rely on polarization to separate the diffuse and specular parts and, thus, suffer from a variety of shortcomings. First, state-of-the-art implementations require up to thirteen frames for one scan. To be able to capture performances, these conventional techniques implement very expensive high-speed cameras. Still, the subject being captured is likely to move slightly during the capture process; thus, sophisticated image registration techniques have to be applied to re-align the captured frames. Furthermore, a short exposure time and the use of polarization significantly increase the amount of illumination required, leading to very high energy consumption and heat issues. Finally, polarization of the light limits conventional approaches to capturing a high-resolution specular normal map from a restricted set of viewpoints.

As the foregoing illustrates, there is a need in the art for an improved technique for capture of high-resolution models, such as high-resolution face models.

SUMMARY

Embodiments of the invention provide a technique that adds mesoscopic detail to low-frequency geometry recovered by a reconstruction technique such as stereoscopic reconstruction. In certain embodiments, mesoscopic skin details are present within certain bands in the spatial frequency domain. Embodiments of the invention apply one or more bandpass filters to extract one or more different types of details from the subject. The features are then used to modulate the low-frequency geometry.

One embodiment of the invention provides a computer-implemented method for generating a three-dimensional model of an object. The method includes generating a coarse geometry mesh of the object using a reconstruction method such as stereo reconstruction; optimizing the coarse geometry mesh based on photometric consistency and surface consistency associated with the coarse geometry mesh; determining a first set of mesoscopic details associated with the object by applying a filter to an image of the object, where mesoscopic details included in the first set of mesoscopic details are detectable in the image of the object and are not reconstructable when generating the coarse geometry mesh of the object; and refining the optimized coarse geometry mesh with the first set of mesoscopic details to generate the three-dimensional model for the object.

Another embodiment of the invention provides a computer-implemented method for generating a three-dimensional model of an object. The method includes generating a coarse geometry mesh of the object; calculating an optimization for the coarse geometry mesh based on photometric consistency and surface consistency associated with the coarse geometry mesh; and refining the coarse geometry mesh based on the optimization.

In embodiments that use stereoscopic reconstruction to recover the low-frequency geometry, the detail is recovered from the same images used for the stereo reconstruction, which is one of the key advantages of this technique over normal estimation. A facial model is then reconstructed from one image per camera. The results are visually close to those produced by current state-of-the-art normal estimation approaches, but with much less cost. Embodiments of the invention offer thus a low-budget alternative for smaller companies or private persons.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF EXEMPLARY EMBODIMENTS

Embodiments of the invention provide a technique that adds mesoscopic detail to low-frequency geometry recovered by a reconstruction technique such as stereoscopic reconstruction. In certain embodiments, mesoscopic skin details are present within certain bands in the spatial frequency domain. Embodiments of the invention apply one or more bandpass filters to extract one or more different types of details from the subject. The features are then used to modulate the low-frequency geometry.

One embodiment of the invention provides a computer-implemented method for generating a three-dimensional model of an object. The method includes generating a coarse geometry mesh of the object using a reconstruction method such as stereo reconstruction; optimizing the coarse geometry mesh based on photometric consistency and surface consistency associated with the coarse geometry mesh; determining a first set of mesoscopic details associated with the object by applying a filter to an image of the object, where mesoscopic details included in the first set of mesoscopic details are detectable in the image of the object and are not reconstructable when generating the coarse geometry mesh of the object; and refining the optimized coarse geometry mesh with the first set of mesoscopic details to generate the three-dimensional model for the object.

Another embodiment of the invention provides a computer-implemented method for generating a three-dimensional model of an object. The method includes generating a coarse geometry mesh of the object; calculating an optimization for the coarse geometry mesh based on photometric consistency and surface consistency associated with the coarse geometry mesh; and refining the coarse geometry mesh based on the optimization.

In embodiments that use stereoscopic reconstruction to recover the low-frequency geometry, the detail is recovered from the same images used for the stereo reconstruction, which is one of the key advantages of this technique over normal estimation. A facial model is then reconstructed from one image per camera. The results are visually close to those produced by current state-of-the-art normal estimation approaches, but with much less cost. Embodiments of the invention offer thus a low-budget alternative for smaller companies or private persons.

Skin is a complex structure that includes a variety of components. In some embodiments, skin can be considered at three different scales: a microscopic scale, a mesoscopic scale, and a macroscopic scale. Skin features in the microscopic scale are not perceivable in images captured by cameras, while the macroscopic scale is too coarse to be suited for detailed features. At the mesoscopic scale, features may be classified into two groups. A first group is based on color variation. Spots, freckles, and moles are examples of the first group of mesoscopic scale features. A second group is based on geometric variation. Pores, fine wrinkles, and facial hair belong to this group. In some embodiments, each of the features in the first and second groups lies in a particular range of the spatial frequency spectrum of an image.

Thus, according to embodiments of the invention, mesoscopic features can be extracted from an image based on the spatial frequency content of the image. In some embodiments, mesoscopic features are those features that are perceptible in an image of an object, but are not measurable in the coarse geometry that results from performing reconstruction, such as stereo reconstruction, of the object. In some embodiments, the coarse geometry may include larger scale features of the object than the mesoscopic features. For example, pore information can be extracted from an image. Pores cover the face in a very regular fashion and are well suited as features for image registration. Additionally, pores are typically isotropic (i.e., symmetrical along each axis). In one embodiment, an image can be filtered by an appropriately selected bandpass filter. The result can be further filtered with a Laplacian filter and a non-maxima suppression algorithm to find the location of the mesoscopic details. As a last step, embodiments of the invention may weight feature candidates by the response of the Laplacian. Other isotropic features, such as pimples, can be extracted in a similar fashion, while anisotropic features, such as wrinkles, may require different filters.

System Overview

Figure 1:
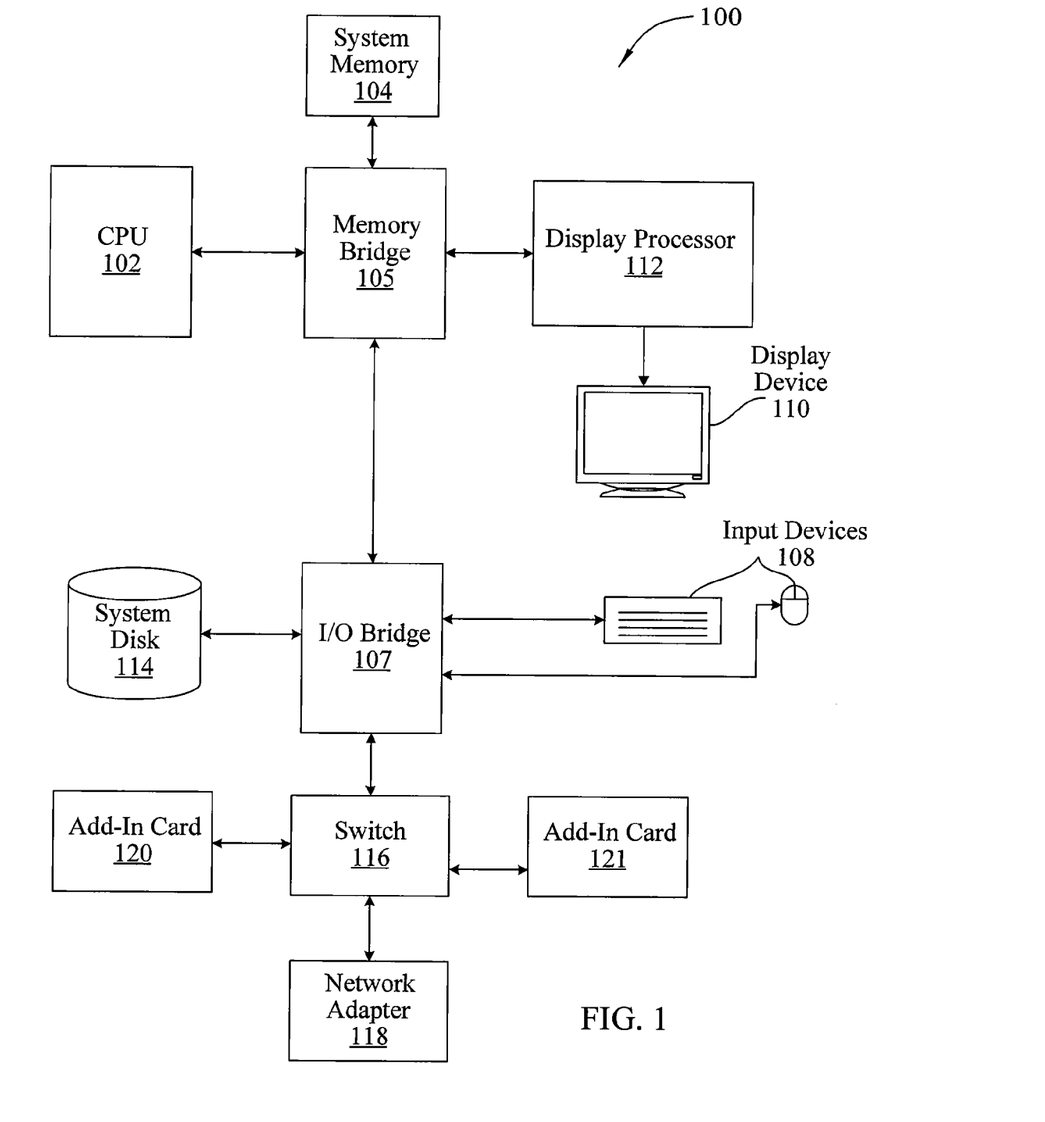
FIG. 1 is a block diagram of a system configured to implement one or more aspects of the present invention.

FIG. 1 is a block diagram of a system 100 configured to implement one or more aspects of the present invention. System 100 may be a computer workstation, personal computer, video game console, personal digital assistant, rendering engine, mobile phone, or any other device suitable for practicing one or more embodiments of the present invention.

As shown, system 100 includes a central processing unit (CPU) 102 and a system memory 104 communicating via a bus path that may include a memory bridge 105. CPU 102 includes one or more processing cores, and, in operation, CPU 102 is the master processor of system 100, controlling and coordinating operations of other system components. System memory 104 stores software applications and data for use by CPU 102. CPU 102 runs software applications and optionally an operating system. Memory bridge 105, which may be, e.g., a Northbridge chip, is connected via a bus or other communication path (e.g., a HyperTransport link) to an I/O (input/output) bridge 107. I/O bridge 107, which may be, e.g., a Southbridge chip, receives user input from one or more user input devices 108 (e.g., keyboard, mouse, joystick, digitizer tablets, touch pads, touch screens, still or video cameras, motion sensors, and/or microphones) and forwards the input to CPU 102 via memory bridge 105.

A display processor 112 is coupled to memory bridge 105 via a bus or other communication path (e.g., a PCI Express, Accelerated Graphics Port, or HyperTransport link); in one embodiment display processor 112 is a graphics subsystem that includes at least one graphics processing unit (GPU) and graphics memory. Graphics memory includes a display memory (e.g., a frame buffer) used for storing pixel data for each pixel of an output image. Graphics memory can be integrated in the same device as the GPU, connected as a separate device with the GPU, and/or implemented within system memory 104.

Display processor 112 periodically delivers pixels to a display device 110 (e.g., a screen or conventional CRT, plasma, OLED, SED or LCD based monitor or television). Additionally, display processor 112 may output pixels to film recorders adapted to reproduce computer generated images on photographic film. Display processor 112 can provide display device 110 with an analog or digital signal.

A system disk 114 is also connected to I/O bridge 107 and may be configured to store content and applications and data for use by CPU 102 and display processor 112. System disk 114 provides non-volatile storage for applications and data and may include fixed or removable hard disk drives, flash memory devices, and CD-ROM, DVD-ROM, Blu-ray, HD-DVD, or other magnetic, optical, or solid state storage devices.

A switch 116 provides connections between I/O bridge 107 and other components such as a network adapter 118 and various add-in cards 120 and 121. Network adapter 118 allows system 100 to communicate with other systems via an electronic communications network, and may include wired or wireless communication over local area networks and wide area networks such as the Internet.

Other components (not shown), including USB or other port connections, film recording devices, and the like, may also be connected to I/O bridge 107. For example, an audio processor may be used to generate analog or digital audio output from instructions and/or data provided by CPU 102, system memory 104, or system disk 114. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols, as is known in the art.

In one embodiment, display processor 112 incorporates circuitry optimized for graphics and video processing, including, for example, video output circuitry, and constitutes a graphics processing unit (GPU). In another embodiment, display processor 112 incorporates circuitry optimized for general purpose processing. In yet another embodiment, display processor 112 may be integrated with one or more other system elements, such as the memory bridge 105, CPU 102, and I/O bridge 107 to form a system on chip (SoC). In still further embodiments, display processor 112 is omitted and software executed by CPU 102 performs the functions of display processor 112.

Pixel data can be provided to display processor 112 directly from CPU 102. In some embodiments of the present invention, instructions and/or data representing a scene are provided to a render farm or a set of server computers, each similar to system 100, via network adapter 118 or system disk 114. The render farm generates one or more rendered images of the scene using the provided instructions and/or data. These rendered images may be stored on computer-readable media in a digital format and optionally returned to system 100 for display. Similarly, stereo image pairs processed by display processor 112 may be output to other systems for display, stored in system disk 114, or stored on computer-readable media in a digital format.

Alternatively, CPU 102 provides display processor 112 with data and/or instructions defining the desired output images, from which display processor 112 generates the pixel data of one or more output images, including characterizing and/or adjusting the offset between stereo image pairs. The data and/or instructions defining the desired output images can be stored in system memory 104 or graphics memory within display processor 112. In an embodiment, display processor 112 includes 3D rendering capabilities for generating pixel data for output images from instructions and data defining the geometry, lighting shading, texturing, motion, and/or camera parameters for a scene. Display processor 112 can further include one or more programmable execution units capable of executing shader programs, tone mapping programs, and the like.

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies display processor 112 is connected to I/O bridge 107 or directly to CPU 102, rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

According to embodiments of the invention, mesoscopic features can be extracted from an image based on the spatial frequency content of the image. Certain embodiments of the invention may be implemented in software stored in system memory 104 and executed by CPU 102 and/or display processor 112. Other embodiments may be implemented as one or more shader programs executed by display processor 112. Still further embodiments may be implemented in fixed function hardware included within display processor 112. Other embodiments may be implemented as a combination of hardware and software.

Mesoscopic Geometry Modulation

Figure 2:
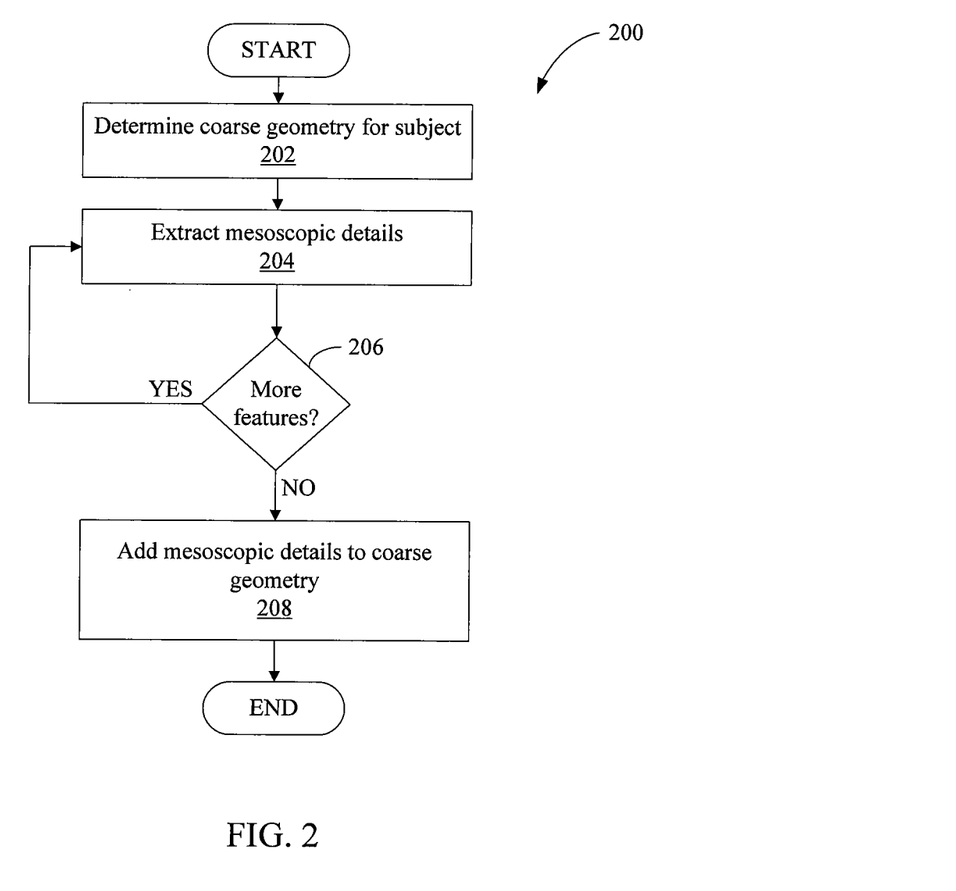
FIG. 2 is a flow diagram of method steps for recovering mesoscopic details when capturing and reconstructing a subject, according to one embodiment of the invention.

FIG. 2 is a flow diagram of method steps for recovering mesoscopic details when capturing and reconstructing a subject, according to one embodiment of the invention. Persons skilled in the art will understand that, even though the method 200 is described in conjunction with the system of FIG. 1, any system configured to perform the method steps, in any order, is within the scope of embodiments of the invention.

As shown, the method 200 begins at step 202, where a processor determines a coarse geometry for a subject. In one embodiment, the subject is a human head, and a coarse geometry for the human head includes a general shape of the head, providing a shape for the major features, such as a nose, ears, eyes, mouth, among others. Mesoscopic details (e.g., pores, imperfections, hair, among others) are not included in the coarse geometry. For example, the coarse geometry may provide a plastic-looking and/or "waxy" geometry for the subject.

Figure 3A:
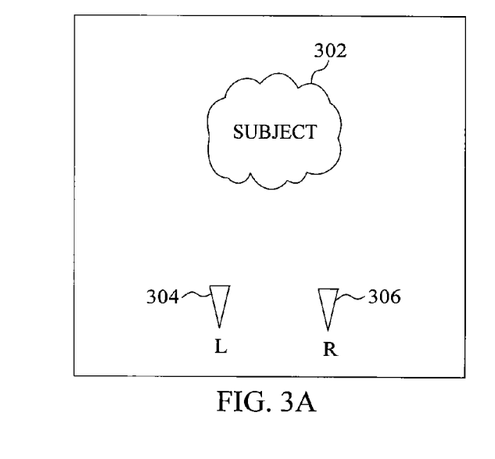
FIG. 3A is a conceptual diagram illustrating capturing a subject using two cameras, according to one embodiment of the invention.
Figure 3B:
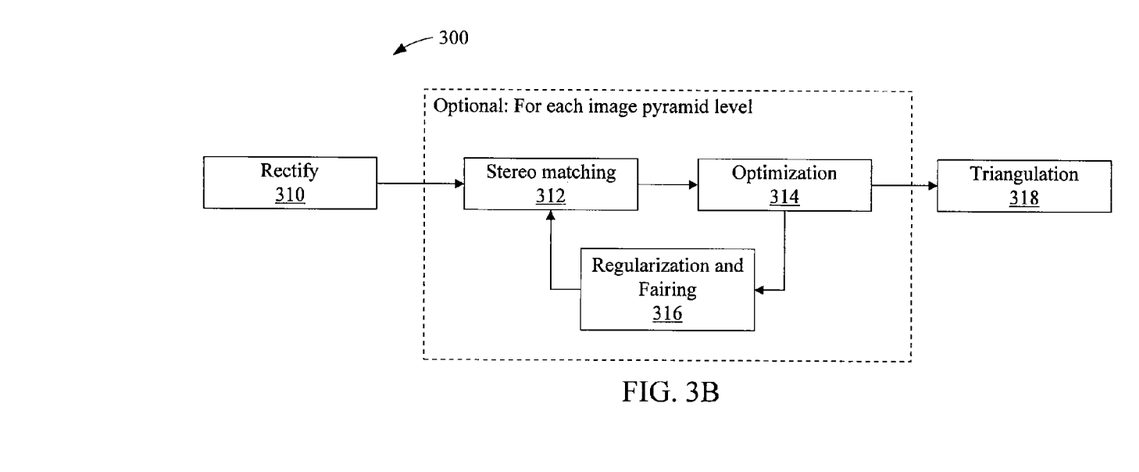
FIG. 3B is a flow diagram of method steps for performing stereo reconstruction, according to one embodiment of the invention.

In one embodiment, the coarse geometry is determined using (multi-view) stereo reconstruction, as described in FIG. 3B. In other embodiments, any other technically feasible technique for determining the coarse geometry may be implemented.

Stereo reconstruction involves finding correspondences between two images of a subject. Once the corresponding pixel and/or sub-pixel locations are determined between the two images, the reconstruction can be easily achieved. Image registration has been an intense field of research over the past several decades, not only for stereo reconstruction but also optical flow analysis, medical imaging, and others. During this time, many different techniques have been proposed.

FIG. 3A is a conceptual diagram illustrating capturing a subject 302 using two cameras 304, 306, according to one embodiment of the invention. As shown, camera 304 captures the subject 302 from the left; whereas, camera 306 captures the subject 320 from the right. In some embodiments, the images for cameras 304, 306 may be captured simultaneously to reduce temporal discontinuities. From the resultant images, stereo reconstruction may be implemented to generate the coarse geometry for the subject 302.

FIG. 3B is a flow diagram of method steps for performing stereo reconstruction, according to one embodiment of the invention. Persons skilled in the art will understand that, even though the method 300 is described in conjunction with the systems of FIGS. 1 and 3A, any system configured to perform the method steps, in any order, is within the scope of embodiments of the invention.

As shown, the method 300 begins at step 310, where a processor rectifies the images. Stereo reconstruction involves finding correspondences between points in one image and points in another image. For example, for a given point p in image I, stereo reconstruction involves finding corresponding point q in image J. Embodiments of the invention operate with a calibrated setup; thus, the search range can be constrained to one dimension. This constraint is called epipolar constraint and states that the corresponding point q in image J for a point p in image I has to lie on the epipolar line, and vice versa. The matching becomes especially simple when these lines correspond to the same rows in the images, which is achieved with rectification.

At step 312, the processor performs stereo matching. In one embodiment, a block-based matching algorithm may be used (also called a patch-based or area-based matching algorithm). The matching quality is computed for all possible correspondences $q_i$ via an error functions and the correspondence with lowest error is selected. Commonly used error functions include the Sum of Squared Distances (SSD), the Sum of Absolute Differences (SAD), or cross-correlation. Additional improvements may be implemented in the stereo matching algorithm, such as adding constraints, bi-directional matching, and sub-pixel matching. Still further, some embodiments of the invention may include a matching quality metric that ensures that correspondences have low error and good localization.

At step 314, the processor performs optimization. In some embodiments, stereo matching provides only a coarse initial estimation of a disparity map. This map may also include entire patches of outliers, especially at discontinuities or regions visible to only one of the cameras. One or more additional processing steps may be performed to optimize the disparity map, including patch filling and discontinuity relocation.

In one embodiment, the optimization is defined as an iterative refinement of the disparity d using photometric consistency and surface-consistency. The optimization is performed both on the disparity map and later on the surface. Both optimizations may be implemented as iterative processes. In some embodiments, the optimizations preserve the volume and converge quickly to the desired solution. Since the convergence is close to exponential at the beginning, embodiments of the invention terminate the optimization before convergence is reached to strike a balance between quality and computational effort. This is especially valuable for lower resolution layers of a disparity pyramid, as described below, since the next higher level is going to refine the disparities anyway and some embodiments, therefore, need only to eliminate the gross errors.

1. Disparity Map Optimization

In one embodiment, the disparity values are updated in every iteration as a linear combination of $d_p$ and $d_s$, where $d_p$ is an adjustment in the direction of improved photometric-consistency, and $d_s$ is an adjustment in the direction of improved surface-consistency.

Compute $d_p$—Given a current pixel p in image I and its match q in image J, embodiments of the invention compute the normalized cross-correlation (NCC) of p with q−1, q, q+1, where the offsets indicate the left-neighbors and right-neighbors of q. The respective NCCs are labeled $\xi_{-1}, \xi_0, \xi_{+1}$, and $d_p$ is calculated as:

$$d_p = p - q + \begin{cases} -0.5 & \xi_{-1} < \xi_0, \xi_{+1} \\ 0.5 \frac{(\xi_{-1} - \xi_{+1})}{\xi_{-1} + \xi_{+1} - 2\xi_0} & \xi_0 < \xi_{-1}, \xi_{+1} \\ +0.5 & \xi_{+1} < \xi_{-1}, \xi_0. \end{cases} \quad \text{(Equation 1)}$$

Compute $d_s$—The formulation of surface-consistency has been designed for human faces, where disparity varies smoothly with just a few depth discontinuities. Some embodiments use anisotropic kernels, which adapt to the local gradient to avoid smoothening across boundaries. For human faces, however, regions of high gradient are mostly due to different foreshortening of the camera pairs and smoothening should not be attenuated within these regions. Embodiments of the invention employ second-order properties, but use them within an anisotropic formulation over a two-dimensional domain. The equation can be discretized as:

$$d_s = \frac{w_x(d_{x-1,y} + d_{x+1,y}) + w_y(d_{x,y-1} + d_{x,y+1})}{2(w_x + w_y)}, \quad \text{(Equation 2)}$$

where $w_x = \exp(-(|d_{x-1,y} - d_{x,y}| - |d_{x+1,y} - d_{x,y}|)^2)$. These weights render the harmonic equation anisotropic, reducing smoothing across depth discontinuities.

Compute d'—In one embodiment, d' is defined as $d' = (w_p d_p + w_s d_s)/(w_s + w_p)$, where $w_s$ is a user-specified weighting scalar that controls the smoothness and $w_p$ is $$w_p = \begin{cases} \xi_0 - \xi_{-1} & \xi_{-1} < \xi_0, \xi_{+1} \\ 0.5(\xi_{-1} + \xi_{+1} - 2\xi_0) & \xi_0 < \xi_{-1}, \xi_{+1} \\ \xi_0 - \xi_{+1} & \xi_{+1} < \xi_{-1}, \xi_0. \end{cases} \quad \text{(Equation 3)}$$

This gives a higher-weighting to the photometric term in textured areas of the image where the image data is most informative about feature localization.

2. Surface Optimization

The surface optimization differs from the disparity map optimization in that embodiments optimize in continuous 3-space. To keep computation tractable, embodiments of the invention restrict the optimization to along the normal direction n at X and define an optimization resolution δ (usually 0.1 mm). This, then, results in a discrete one-dimensional optimization, and embodiments proceed in a manner analogous to the disparity map optimization, by iterating over all points and computing updates for X as a linear combination of $X_p$ and $X_s$, where $X_p$ is an adjustment in the direction of improved photometric-consistency, and $X_s$ is an adjustment in the direction of improved surface-consistency.

Compute $X_p$—Embodiments generate the points $X_{-\delta}=X-\delta n$ and $X_{+\delta}=X+\delta n$. Embodiments define as reference view the camera with the least foreshortened view of X. Then, embodiments measure a photo-consistency error for a point by taking the NCC between an x-by-x patch (e.g., x may be equal to 3) centered at the projection in the reference image and the corresponding patches in all the other images. Given error values for $X_{-\delta}$, $X_0$, and $X_{+\delta}$, embodiments compute $\delta_p$ analogously to $d_p$.

Compute $X_s$—The surface-consistency estimate $X_s$, is computed using mean-curvature flow, using known techniques.

Compute X'—Compute $X'=(w_p X_p + w_s X_s)/(w_p + w_s)$ where $w_p$ and $w_s$ are, in some embodiments, the same as in the disparity map optimization computation.

At step 316, the processor performs regularization and fairing. Regions only visible to one camera are likely to not be recovered by the optimization techniques performed at step 314, since those techniques rely on mutual information from both cameras. These drawbacks can be overcome by performing regularization and fairing. In some embodiments, regularization propagates information into regions that could not be matched, and fairing attenuates noise while preserving the essential features.

Additionally, to speed up computation and to be more robust with respect to noise, some embodiments of the invention perform the reconstruction over multiple scales using an "image pyramid." The image pyramid may include a pre-defined number of layers, where each layer is a sub-sampled version of the next lower layer. The bottom layer is the original image. Some embodiments of the invention sub-sample the images by a factor of two. To avoid aliasing, a low-pass filter may be applied to the images with a Gaussian. Let $\Delta_I$ denote the image pyramid for image I. The image pyramid includes $|\Delta_I|-1$ layers, with layer 0 comprising the original image. To express the dependency on a layer, embodiments of the invention use superscripts. Furthermore, two operators are introduced that relate the individual layers. The lifting operator ↑ lifts a pixel from layer l to the next higher layer (l+1) and the refinement operator ↓ takes the pixel in the opposite direction:

$$\uparrow(p^l) = s^{-1} p^l$$

$$\downarrow(p^l) = s p^l,$$

where s is the sub-sampling factor. Given two image pyramids ($\Delta_I$ and $\Delta_J$), the following pseudo-code in Table 1 defines an algorithm for fining the point q in image J that corresponds best to point p in image I:

TABLE 1

Require: Image Pyramids $\Delta_I$ and $\Delta_J$, point p
Ensure: q
   $p^0 := p$
   $p^{|\Delta_I|-1} := \uparrow (p^0)^{|\Delta_I|-2}$ {Lift p to the top layer}
   find the corresponding point $p^{|\Delta_I|-1}$ for $p^{|\Delta_J|-1}$ on the top layer
   for l = $|\Delta_I|$ − 2 to 0 do
     $p^l := \downarrow (p^{l+1})$
     $q^l := \downarrow (q^{l+1})$
     update $q^l$ with the image on layer l
   end for
   $q := q^0$ At step 318, the processor performs triangulation to reconstruct the coarse geometry of the subject. Any technically feasible approach may be implemented to perform step 318, including computing an intersection of two rays or performing a least squares computation.

Again, as described above, the method 300 illustrated in FIG. 3B involving stereoscopic reconstruction provides only one technique for determining the coarse geometry for the subject (i.e., step 202 in FIG. 2). Any other technique for determining a coarse geometry for the subject is also within the scope of embodiments of the invention.

Referring back to FIG. 2, at step 204, the processor applies a band pass filter to extract mesoscopic details. As described above, the mesoscopic details contribute to the high spatial frequency content of the captured images. The technique of applying a band pass filter to extract the mesoscopic details is based on the observation that the shading in the image space is associated with the geometry of the subject. Based on this observation, embodiments of the invention present heuristics to extract the mesoscopic detail from the captured images.

According to various embodiments, each different mesoscopic detail may be associated with a different band of frequencies. For example, pores may be associated with a first band of frequencies, and facial hair may be associated with a second band of frequencies. Other bands of frequencies may be associated with other mesoscopic details, such as spots, freckles, moles, and/or fine wrinkles, among others. A separate band pass filter may be applied to the image to extract the details associated with a particular mesoscopic feature (e.g., pores).

Additionally, in some embodiments, the frequency band of a particular mesoscopic feature may be determined empirically based on knowledge of the resolution of the image, how close the subject is to the camera, and/or the size of the mesoscopic feature (e.g., average pore size). Alternatively, in other embodiments, the frequency band or range of a particular mesoscopic feature may be calculated automatically for each image being processed using a detection algorithm.

As described, the mesoscopic skin details may be extracted from images with a bandpass filter, such as:

$$\delta = s(I^* f_u),$$

where $f_u$ is the bandpass filter and s is a scaling factor that controls the emboss strength of the high-frequency feature. For example, a first scale factor can be used when applying a first bandpass filter associated with a first mesoscopic feature (e.g., pores), and a second scale factor can be used when applying a second bandpass filter associated with a second mesoscopic feature (e.g., facial hair). Based on the relative strength or weakness of the scaling factors, the emboss strength of a particular feature can be accentuated or diminished. For example, applying a larger scaling factor for a first mesoscopic feature causes that feature to be more prominent in the resultant reconstruction.

At step 206, the processor determines if any other features should be extracted. If the processor determines that at least one other feature should be extracted from the images, then the method 300 returns to step 204, described above. Again, according to embodiments of the invention, each separate mesoscopic feature falls in a different band of spatial frequencies. Thus, the feedback loop between steps 206 and 204 allows embodiments of the invention to capture two or more different types of mesoscopic details in a single reconstruction. If, at step 206, the processor determines that no more features are to be extracted from the images, then the method 200 proceeds to step 208.

At step 208, the processor adds the mesoscopic detail(s) to the coarse geometry. In one embodiment, a normal displacement technique may be implemented to add the mesoscopic detail(s) to the coarse geometry, as described in FIGS. 4A-4D. In other embodiments, any other technically feasible technique may be implemented.

Figure 4A:
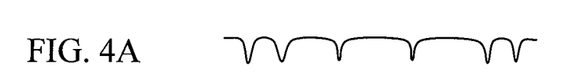
FIG. 4A is a conceptual illustration of mesoscopic details, according to one embodiment of the invention.

FIG. 4A is a conceptual illustration of mesoscopic details, according to one embodiment of the invention. In the example shown in FIG. 4A, the mesoscopic details represent pores on skin. For example, the relative spacing of the mesoscopic details represents the spacing of the pores, and the relative depth represents a depth of the pores. Again, as described in FIG. 2, these mesoscopic details are derived from the spatial frequencies in image space. In some embodiments, the spacing of the mesoscopic features corresponds to the physical spacing of those features in the subject. However, the depth of the mesoscopic features is not physically accurate.

Figure 4B:
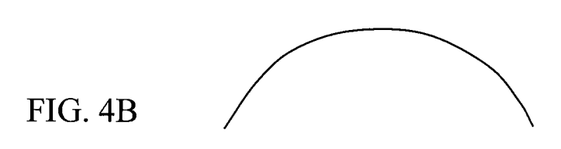
FIG. 4B is a conceptual illustration of coarse geometry, according to one embodiment of the invention.

FIG. 4B is a conceptual illustration of a coarse geometry, according to one embodiment of the invention. The coarse geometry may have been determined using the stereo reconstruction technique described in FIG. 3B. In other embodiments, the coarse geometry may have been determined using any technically feasible technique. For example, the coarse geometry may represent the tip of a nose.

Figure 4C:
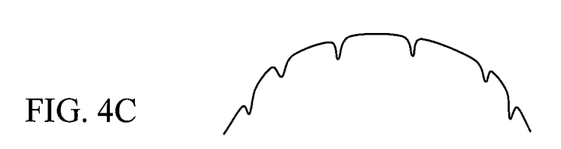
FIG. 4C is a conceptual illustration of the mesoscopic details applied to the coarse geometry with disparity displacement, according to one embodiment of the invention.

FIG. 4C is a conceptual illustration of the mesoscopic details applied to the coarse geometry with disparity displacement, according to one embodiment of the invention. As shown, the relative spacing of the mesoscopic details shown in FIG. 4C corresponds to the spacing of mesoscopic details in FIG. 4A. However, as also shown, the pores extend directly downwards in FIG. 4C, regardless of the surface normal at that particular surface location on the coarse geometry.

Figure 4D:
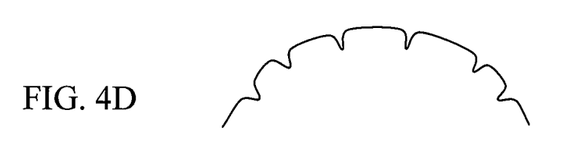
FIG. 4D is a conceptual illustration of the mesoscopic details applied to the coarse geometry with normal displacement, according to one embodiment of the invention.

FIG. 4D is a conceptual illustration of the mesoscopic details applied to the coarse geometry with normal displacement, according to one embodiment of the invention. As shown, the relative spacing of the mesoscopic details shown in FIG. 4D corresponds to the spacing of mesoscopic details in FIG. 4A. Additionally, the mesoscopic details shown in FIG. 4D are aligned with the surface normal at each particular surface location on the coarse geometry.

Modeling of Mesoscopic Geometry

The surface optimization technique described above results in a surface geometry that is smooth across skin pores and fine wrinkles since the disparity change across such a feature is too small to detect. The result is a flatness and lack of realism in synthesized views of the face. On the other hand, visual inspection shows the presence of pores and fine wrinkles in the images. The technique disclosed below uses image texture to emboss the recovered 3D geometry. The technique is qualitative and the geometry that is recovered is not metrically correct. However, modulation of the macroscopic geometry with fine-scale features does produce a significant improvement of the perceived quality of synthesized faces.

For this mesoscopic optimization we are only interested in features that are too small to be recovered by the reconstruction algorithm (e.g., implemented at step 202). Embodiments of the invention, first compute high-pass filtered values $\mu$ for all points X using the projection of a Gaussian N:

$$\mu(X) = \frac{\sum_{c \in \nu} \alpha_c (I_c(x) - [N_{\Sigma_c} \otimes I_c](x))}{\sum_{c \in \nu} \alpha_c},$$ (Equation 4)

where $\nu$ denotes the set of visible cameras and the weighting term $\alpha$ is the foreshortening. In some embodiments, the variance is chosen in dependence of the matching window m. In other embodiments, the variance can be empirically determined, for example by measuring the size of the mesoscopic features.

The mesoscopic values $\mu$ are then used to compute $X_\mu = X + \delta_\mu n$ over the neighborhood R with:

$$\delta_\mu = -\eta \frac{\sum_{i \in R} w_i \left(1 - \frac{|\langle X - X_i, n \rangle|}{\|X - X_i\|}\right)(\mu(X_i) - \mu(X))}{\sum_{i \in R} w_i},$$ (Equation 5)

where the weights are computed by a radial basis function such as $w_i = \exp(-|X - X_i|)$ and $\eta$ is the embossing strength. The update of the 3D point now uses all three adjusted points $X_p$, $X_s$ and $X_\mu$ to compute $X' = (w_p X_p + w_s X_s + w_\mu X_\mu)/(w_p + w_s + w_\mu)$. The weights $w_p$ and $w_s$ are the same as in the surface optimization calculation, described above, and $w_\mu$ is defined as $$w_\mu = \rho \frac{3\xi_0}{\delta(\xi_{-\delta} + \xi_0 + \xi_{+\delta})},$$ (Equation 6)

with $\rho$ being a user-specified term that controls the influence of the mesoscopic term. Pseudo code describing this technique is provided in Table 2, below. The disparity map optimization calculation and the surface optimization calculation, described above, are similar and of less complexity that the algorithm put forth in Table 2 since the mesoscopic term is not present in those optimizations. The function in Table 2 computes the position update X' for X using the normal n. In one example, the parameters and may have values of: resolution $\delta = 0.05$ in mm, surface smoothness $\lambda = 0.03$, mesoscopic weight $\rho = 0.07$ and embossing strength $\eta = 0.2$.

TABLE 2

X' = optimizePointMesoscopic(X; n; $\delta$; $\lambda$; $\rho$; $\eta$)
$\xi_{-1}$ = (1 − NCC(X − $\delta$n))/2
$\xi_0$ = (1 − NCC(X))/2
$\xi_{+1}$ = (1 − NCC(X + $\delta$n))/2
if $\xi_{-1}$ < $\xi_0$, $\xi_{+1}$ then
   $\delta_p$ = −0.5$\delta$
   $w_p$ = ($\xi_0$ − $\xi_{-1}$)/$\delta$
else if $\xi_{+1}$ < $\xi_{-1}$, $\xi_0$ then
   $d_p$ = 0.5$\delta$
   $w_p$ = ($\xi_0$ − $\xi_{+1}$)/$\delta$ TABLE 2-continued else
$\quad \delta_p = 0.5(\xi_{-1} - \xi_{+1})/(\xi_{-1} + \xi_{+1} - 2\xi_0)\delta$
$\quad w_p = 0.5(\xi_{-1} + \xi_{+1} - 2\xi_0)/\delta$
end if
$\delta_s = -\bar{\kappa} n$
$w_s = \lambda$ $$\delta_\mu = -\eta \frac{\sum_{i \in R} \exp(-\|X - X_i\|)\left(1 - \frac{|\langle X - X_i, n \rangle|}{\|X - X_i\|}\right)(\mu(X_i) - \mu(X))}{\sum_{i \in R} \exp(-\|X - X_i\|)}$$

$w_\mu = 3\rho\xi_0/\delta(\xi_{-\delta} + \xi_0 + \xi_{+\delta})$
$X' = X + (w_p\delta_p + w_s\delta_s + w_\mu\delta_\mu)/(w_p + w_s + w_\mu) n$ Thus, embodiments of the invention offer an alternative technique for high-resolution scanning in situations where visual plausibility, and not physical correctness, is the main goal. Embodiments of the invention operate using the same data used for stereo reconstruction, which includes a single image per viewpoint. Thus, the setup required to implement embodiments of the invention is relatively inexpensive. The quality of the results, however, is sufficient for computer games and also for movies.

In some embodiments, additional improvements may be added to the techniques described herein to further improve the quality of the captured 3D model. As described, different frequency-bands are associated with different details. Thus, instead of just modulating the surface with one band of spatial frequencies, multiple bands of frequencies could be used to convey certain structure. The same effects could be achieved by using more sophisticated filters other than just bandpass filters. Additionally, in some embodiments, normal estimation at grazing angles could be employed to estimate the emboss direction of mesoscopic features. If the detail contains enough geometric variation, then the normals enclose grazing angles at some point. It is not necessary to estimate the normals, but only the variation in the normals to identify geometric detail. This variation could then be used to separate geometric and texture detail as well as the emboss direction. Another option could be to learn the features and their emboss direction with machine learning techniques following shape-from-shading approaches.

In sum, mesoscopic geometry modulation produces results which are visually close to the ones produced by current state-of-the-art normal estimation approaches, but with much less cost. Any system that can capture coarse geometry and high-resolution images can be used to improve the coarse geometry with the addition of fine details. However, since the mesoscopic details of the reconstruction are based on spatial frequency variation in image space and not actual geometric features, the mesoscopic details are not physically accurate. The results, however, are still visually pleasing. To the human observer, the results of applying embodiments of the invention are much more realistic-looking than simply using the coarse reconstruction, which appears waxy and inhuman.

Additionally, as should be apparent to those having ordinary skill in the art, embodiments of the invention can be applied to any subject, not just human faces. As long as a frequency band is determined (either pre-determined, derived analytically, or calculated empirically) for the mesoscopic features of the subject, then embodiments of the invention can be used to generate a 3D model that includes the mesoscopic features. For example, the fine lines and wrinkles of foliage may be captured using the techniques described herein.

One advantage of embodiments of the invention is the ability to produce plausible-looking high-quality facial scans from the same two images required for stereo reconstruction. Another advantage is that these techniques present a low-cost option for applications where visual plausibility is the main focus. Yet another advantage is that embodiments of the invention are easily implemented in a shading program on a GPU.

Various embodiments of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments and numerous specific details are set forth to provide a more thorough understanding of the invention. Persons skilled in the art, however, will understand that various modifications and changes may be made thereto without departing from the broader spirit and scope of the invention. The foregoing description and drawings are, accordingly, to be regarded in an illustrative rather than a restrictive sense.

What is claimed is:

1. A computer-implemented method for generating a three-dimensional model of an object, the method comprising:
    implementing, via one or more processors, a stereo reconstruction technique, wherein the stereo reconstruction technique provides an initial estimate of a disparity map;
    optimizing disparity values of the disparity map by adjusting the disparity values in directions of determined improved photometric-consistency and in directions of determined improved surface-consistency, wherein the directions of improved surface-consistency are determined using a smoothing term having a second-order anisotropic formulation;
    generating a geometry mesh of the object from the optimized disparity map.

2. The method of claim 1, wherein implementing the stereo reconstruction is based on two images of the object used to generate the geometry mesh.

3. The method of claim 2, wherein implementing the stereo reconstruction comprises:
    rectifying the two images of the object;
    applying a high-pass filter to the two images of the object to extract high spatial frequency features; and
    performing stereo matching based on the high spatial frequency features.

4. The method of claim 1, further comprising determining a first set of mesoscopic details associated with the object by applying a filter to an image of the object, wherein mesoscopic details included in the first set of mesoscopic details are detectable in the image of the object and are not reconstructable when generating the geometry mesh of the object.

5. The method of claim 4, wherein the filter corresponds to a range of spatial frequencies that is associated with the first set of mesoscopic details.

6. The method of claim 4, further comprising modulating a refinement of the geometry mesh, based on photometric consistency and surface consistency, with the first set of mesoscopic details.

7. The method of claim 6, wherein modulating the refinement of the geometry mesh with the first set of mesoscopic details is based on a mesoscopic consistency term.

8. The method of claim 4, wherein the object comprises a human head, and the mesoscopic details comprise spots, freckles, moles, pores, fine wrinkles, or facial hair.

9. A non-transitory computer-readable storage medium storing instructions that, when executed by a processor, cause a computer system to generate a three-dimensional model of an object, by performing the steps comprising:
　implementing a stereo reconstruction technique, wherein the stereo reconstruction technique provides an initial estimate of a disparity map;
　optimizing disparity values of the disparity map by adjusting the disparity values in directions of determined improved photometric-consistency and in directions of determined improved surface-consistency, wherein the directions of improved surface-consistency are determined using a smoothing term having a second-order anisotropic formulation;
　generating a geometry mesh of the object from the optimized disparity map.

10. The computer-readable storage medium of claim 9, wherein implementing the stereo reconstruction is based on two images of the object used to generate the geometry mesh.

11. The computer-readable storage medium of claim 10, wherein implementing the stereo reconstruction comprises:
　rectifying the two images of the object;
　applying a high-pass filter to the two images of the object to extract high spatial frequency features; and
　performing stereo matching based on the high spatial frequency features.

12. The computer-readable storage medium of claim 9, the steps further comprising determining a first set of mesoscopic details associated with the object by applying a filter to an image of the object, wherein mesoscopic details included in the first set of mesoscopic details are detectable in the image of the object and are not reconstructable when generating the geometry mesh of the object.

13. The computer-readable storage medium of claim 12, wherein the filter corresponds to a range of spatial frequencies that is associated with the first set of mesoscopic details.

14. The computer-readable storage medium of claim 12, the steps further comprising modulating a refinement of the geometry mesh, based on photometric consistency and surface consistency, with the first set of mesoscopic details.

15. The computer-readable storage medium of claim 14, wherein modulating the refinement of the geometry mesh with the first set of mesoscopic details is based on a mesoscopic consistency term.

16. The computer-readable storage medium of claim 12, wherein the object comprises a human head, and the mesoscopic details comprise spots, freckles, moles, pores, fine wrinkles, or facial hair.

17. A system for generating a three-dimensional model of an object, the system comprising:
　a processor configured to:
　　implementing a stereo reconstruction technique, wherein the stereo reconstruction technique provides an initial estimate of a disparity map,
　　optimizing disparity values of the disparity map by adjusting the disparity values in directions of determined improved photometric-consistency and in directions of determined improved surface-consistency, wherein the directions of improved surface-consistency are determined using a smoothing term having a second-order anisotropic formulation,
　　generating a geometry mesh of the object from the optimized disparity map.

18. The system of claim 17, further comprising a memory storing instructions that, when executed by the processor, configure the processor to:
　generate the geometry mesh of the object;
　calculate an optimization for the geometry mesh based on photometric consistency and surface consistency; and
　refine the geometry mesh with the optimization.

19. A computer-implemented method for generating a three-dimensional model of an object, the method comprising:
　generating, via one or more processors, a coarse geometry mesh of the object, wherein generating the coarse geometry mesh of the object comprises implementing a stereo reconstruction technique, wherein implementing the stereo reconstruction technique provides an initial estimation of a disparity map;
　calculating an optimization for the coarse geometry mesh based on photometric consistency and surface consistency associated with the coarse geometry mesh;
　refining the coarse geometry mesh based on the optimization; and
　optimizing disparity values associated with the disparity map based on adjusting the disparity values in a determined direction of improved photometric-consistency and in a determined direction of improved surface-consistency.

* * * * *

UNITED STATES PATENT AND TRADEMARK OFFICE
CERTIFICATE OF CORRECTION

| | |
|---|---|
| PATENT NO. | : 8,670,606 B2 |
| APPLICATION NO. | : 12/897518 |
| DATED | : March 11, 2014 |
| INVENTOR(S) | : Beeler et al. |

It is certified that error appears in the above-identified patent and that said Letters Patent is hereby corrected as shown below:

In the Specification:

Column 7, Line 58, delete "functions" and insert -- function $\varepsilon$ -- therefor.

Signed and Sealed this
Twenty-fourth Day of June, 2014

Michelle K. Lee
*Deputy Director of the United States Patent and Trademark Office*